Patented July 25, 1950

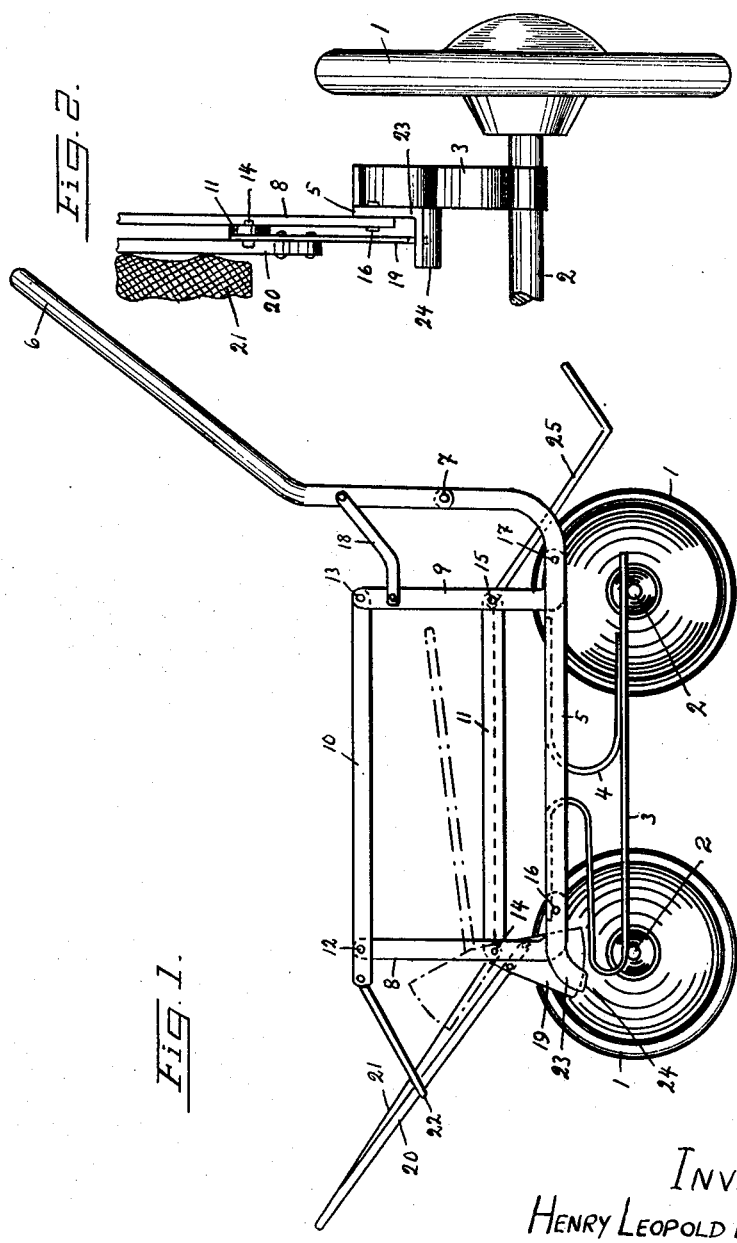

2,516,339

UNITED STATES PATENT OFFICE 2,516,339

FOLDING BABY CARRIAGE

Henry Leopold Persson, Emmaljunga, Sweden

Application February 20, 1948, Serial No. 9,871
In Sweden November 7, 1946

Section 1, Public Law 690, August 8, 1946
Patent expires November 7, 1966

2 Claims. (Cl. 280—36)

Folding baby carriages are already known, which are provided with folding side-frames, each composed of a parallelogram, said side-frames being fixed by means of a back and a fore pivot to the carriage chassis and carrying the carriage seat and the hinged back rest and foot support of the carriage. Furthermore, the side-frames are connected in such a manner with a U-shaped steering member of the carriage, which steering member is hingedly fixed to the chassis, that the side-frames are folded together by pivoting the steering member backwardly and downwardly against the chassis.

Owing to the limited room in modern houses, lifts, omnibuses and street cars, folding baby carriages of this kind are commonly used, but they have the disadvantage, that a great number of manual operations are necessary for the folding and unfolding of the carriage and furthermore the constructions hitherto known do not possess sufficient stability in the folded or the unfolded position.

This disadvantage is eliminated by the present invention, wherein no auxiliary manual operation other than the operation of the back rest or foot support and the pivoting movement of the steering member is needed. Furthermore, the carriage in its collapsed position will occupy a very small place and will be easy to carry with the one hand, whereas the carriage in use will be spacious and has the desired stability in any position.

The invention is illustrated by way of example in the accompanying drawing.

Figure 1 shows the baby carriage in side view, the wheels nearest to the observer not being shown; Fig. 2 shows a detail.

The baby carriage according to the invention consists of the chassis-frame with the running wheels 1 and the springs 3, 4 fixed to the wheel axles 2 at each side of the carriage. On the springs 3, 4 the horizontal bars 5 are rigidly mounted, one on each side of the carriage. To the front upwardly directed ends of the bars 5 the U-shaped steering member 6 of the carriage is pivotally fixed by means of pins 7 in order that it may be folded backwardly and downwardly against the chassis.

On the bars 5 the folding side frames of the carriage are mounted. Each of these frames consists of a parallelogram, composed by two short, vertical arms 8, 9 and two long, horizontal arms 10, 11, the arms being connected with each other by means of pivot pins 12, 13, 14, 15.

The vertical arms 8, 9 are extended downwards beyond the horizontal arm 11 and at their lower ends are pivotally fixed to the horizontal bar 5 by means of pins 16, 17. Between the horizontal arms 11 the seat of the carriage (not shown in the drawing) is mounted and covered by a suitable elastic material 21, which also covers the back rest and is fastened to the front edge of the seat and the upper edge of the back rest.

The front vertical arm 9 in each side frame is connected by means of a short angular arm 18 with the corresponding branch of the steering member 6. Thus, when the steering member 6 is moved backwardly and downwardly, pivoting about the pins 7, the parallelograms forming the side frames are folding together, at which time the vertical arms 8, 9 are pivoting about the pins 16, 17 downwardly to the left, until the bars 5 and the horizontal link arms 10, 11 are lying close to each other. In this position the carriage will occupy a quite small place and will be easy to carry with the one hand.

In order to lock the side-frames in their upright position, according to the invention, at each side of the baby carriage a sector or similarly formed disk member 19 is pivotally mounted on the pins 14, to the inside of which disks the back rest frame 20 is rigidly fixed at such an angle (Figure 1), that after the side frames have been moved to their upright position by swinging the steering member to the position shown in the drawing and the back rest 20 has been moved upwards from its lower position (shown with interrupted lines) between the side-frames to its usage position, in which it is, in a manner known per se, supported by a U-shaped member 22 fastened to the arms 10 for keeping the back rest at a suitable adjustable inclination angle in relation to the seat, each sector like disk member 19, at the said movement of the back rest, is brought in engagement with a stop or retaining member mounted upon the corresponding bar 5. This engagement preferably takes place with the overcoming of a certain spring or friction power. Each of these locking members, in the embodiment illustrated in the drawing is formed by the corresponding bar 5 itself, by the same being extended backwardly beyond the arm 8 by an arcuate part 23, the free end of which, is rectangularly bent inwards to form a hook 24 (Figure 2). This hook 24 is arranged in such a manner, that on moving the back rest 20 the sector like member 19 with its arcuate edge will engage the hook 24, preferably with a certain spring or friction power. As for the folding together of the side-frames a backward directed movement of the pin 14 carrying the sector like member 19 in relation to the rigid bar 5 is required. The side-frames will be effectively locked in their upright position and owing to the spring or friction power the construction will be very steady in upright position. As shown in the drawing the sector like member 19 is of such a size and its arcuate edge is so long respectively, that its engagement with the hook 24 will be maintained independent of the inclination angle of the back rest in relation to the seat. Only when the back rest 20 is moved forwards, will the sector like member 19 be brought out of engagement with the hook 24 and the side-frames are released so that they may be folded together by swinging downwards the steering member 6. Thus, as well for the opening as for the folding together of the carriage, only two simple manual operations are necessary.

I claim:

1. Baby carriage comprising a chassis, folding parallelogram side-frames therefor retained thereon by forward and rear frame pivots, a carriage seat carried by said side frames, a back rest carried by said side frames at the one end thereof by back rest pivots thereon, a foot rest carried by said side frames at the other end thereof by foot rest pivots thereon, and a U-shaped steering member hingedly attached to said chassis and coupled to said side frames, characterised by sector like members fast to said back rest, and stop members on said chassis to engage thereon when said carriage is in the unfolded position, the said back rest pivots and foot rest pivots being mounted eccentrically on said frames with respect to the said forward and rear frames respectively, and the said side frames being prevented from folding together before the back rest and foot rest have been themselves folded, by the sector like members of the back rest engaging on the stop members when the back rest is in the unfolded position.

2. Baby carriage as claimed in claim 1 further characterised in that the sector like members engage frictionally upon the stop members.

HENRY LEOPOLD PERSSON.

No references cited.